United States Patent
Pope

[11] Patent Number: 5,896,707
[45] Date of Patent: Apr. 27, 1999

[54] ROLLER ASSEMBLY FOR ROTATABLE BUILDING

[76] Inventor: Ralph E. Pope, 3680 Ryan's Bluff Dr., Cumming, Ga. 30130

[21] Appl. No.: 08/887,984

[22] Filed: Jul. 3, 1997

[51] Int. Cl.⁶ .................................................. E04B 1/346
[52] U.S. Cl. ........................... 52/65; 248/521; 312/249.2; 384/452; 384/453; 384/615; 384/622
[58] Field of Search ............................ 52/64, 65; 135/98, 135/99, 114, 116; 312/249.2, 285; 384/453, 452, 615, 622; 248/163.1, 349.1, 415, 521

[56] References Cited

U.S. PATENT DOCUMENTS

| | | | |
|---|---|---|---|
| 183,107 | 10/1876 | Beam | 312/249.2 |
| 306,197 | 10/1884 | Warner et al. | 52/65 |
| 636,324 | 11/1899 | Ehrenberg | 312/249.2 |
| 3,815,298 | 6/1974 | Pope | 52/65 |
| 4,644,707 | 2/1987 | Aubourg et al. | 52/65 |
| 4,971,090 | 11/1990 | Uhl | 135/99 X |
| 4,971,460 | 11/1990 | Muntnich et al. | 384/452 |

*Primary Examiner*—Carl D. Friedman
*Assistant Examiner*—Kevin D. Wilkens
*Attorney, Agent, or Firm*—William B. Noll

[57] ABSTRACT

An improved rotational mechanism, or roller assembly, including a central roof support, for use with a rotational building that is characterized by a movable vertical wall. The improved rotational mechanism was designed to prevent binding during rotation of the building, and to prevent or minimize lateral movement and tipping. The rotational mechanism comprises in part an angled member having a vertical leg and a horizontal leg, said horizontal leg projecting inwardly and mounted internally about the lower edge of the building wall. Cooperating with the angled member is an L-shaped angle member, where a radially projecting leg thereof includes at least one ball/transfer caster, preferably a plurality about the building foundation. In operation, the ball/transfer caster is in rolling contact with one horizontally disposed leg of the U-shaped channel. A comparable, laterally directed ball/transfer caster or conventional roller may also be incorporated into the mechanism. By incorporating the central roof support, one can relieve certain of the weight on the ball/transfer caster.

14 Claims, 7 Drawing Sheets

ROLLER ASSEMBLY FOR ROTATABLE BUILDING

FIELD OF THE INVENTION

This invention relates to an improved multi-utility rotatable building of the type disclosed in U.S. Pat. Nos. 4,969,300 and 4,694,620, to the inventor hereof, where such patents are incorporated herein by reference, in their entirety.

BACKGROUND OF THE INVENTION

Buildings of the foregoing prior art patents are those having an upstanding vertical wall terminating in a roof along an upper edge thereof to enclose usable space within the building. The walls include a lower, free standing edge spaced from a fixed foundation therewithin. Typically, the fixed foundation is defined by an outwardly facing wall spaced from the lower, free standing edge, where means are provided within the space to facilitate rotative movement between the fixed foundation and vertical wall.

An effective rotative mechanism, such as one that avoids binding during rotation of the building, has been a major concern of rotatable buildings. An initial effort is taught in '620, wherein the lower edge of the building wall includes an inwardly extending annular horizontal flange providing a track which rests on a series of radially projecting, horizontal rollers, where the rollers project from the building foundation. Additionally, a series of annular vertical rollers are provided as a way of minimizing binding of the relatively movable parts, when the building is moved.

Unfortunately, the mechanism of '620 was an expensive system, and not totally effective in controlling lateral movement. In '300, an improved roller mechanism is disclosed. Specifically, the lower edge of the building wall is provided with a radially inwardly extending flange of inverted U-shape which encompasses the upper peripheries of wheels rotatably mounted on horizontal axles carried by the foundation. It is stated that the inverted U-shape of the flange not only supports the building for free rotation about a vertical axis, but it at all times spaces the building wall from direct engagement with the wheels while restraining the building against substantially any lateral movement relative to the foundation.

While '300 represented an improvement to '620, experience revealed a frequent binding problem. In a structure utilizing the teachings of '300, it was readily apparent that the continuous and annular inverted U-shape flange rides on a wheel that rotates in a single plane on a fixed axis, in other words, round on flat. During rotation there was a tendency for the wheel to ride up the curved flange with the result that troublesome binding occurred.

The present invention represents a significant step forward in the development of an anti-binding rotational mechanism. The manner by which this development achieves this goal may best be understood from the following specification, particularly when read in conjunction with the accompanying drawings.

SUMMARY OF THE INVENTION

The present invention relates to an improved rotational mechanism, or roller assembly, for use with a rotational building characterized by a movable vertical wall and a fixed foundation within and spaced from the movable vertical wall. The rotational mechanism comprises a U-shaped channel projecting into the space and mounted internally about the lower edge of the vertical wall. Cooperating with the U-shaped channel is an L-shaped angle member, where a radially projecting leg thereof includes at least one roller caster assembly, preferably a plurality of such assemblies positioned uniformily about the fixed foundation, having a spherical roller in rolling contact with one horizontally disposed leg of the U-shaped channel.

As an additional feature, where size and weight of the structure may present a concern to one manually rotating the vertical wall, a central support may be provided to relieve some of the weight of the structure and thereby ease such concern.

BRIEF DESCRIPTION OF THE DRAWINGS

FIG. 3 is an enlarged, partial, perspective view of the roller assembly of this invention as illustrated in FIG. 2.

DETAILED DESCRIPTION OF PREFERRED EMBODIMENT

This invention relates to an improved roller assembly for rotatable multi-utility buildings, where general descriptions thereof my be found in U.S. Pat. Nos. 4,694,620 and 4,969,300, to the inventor hereof. These buildings, such as may be used for storage of garden and lawn equipment and tools, have gained wide acceptance over conventional fixed buildings or sheds. They offer the unique advantage of accessibility to all parts of the storage area by the provision of being rotatable through 360 degrees, and thereby avoid the need for an aisle or walking room to locate otherwise remote items.

Figure 1:
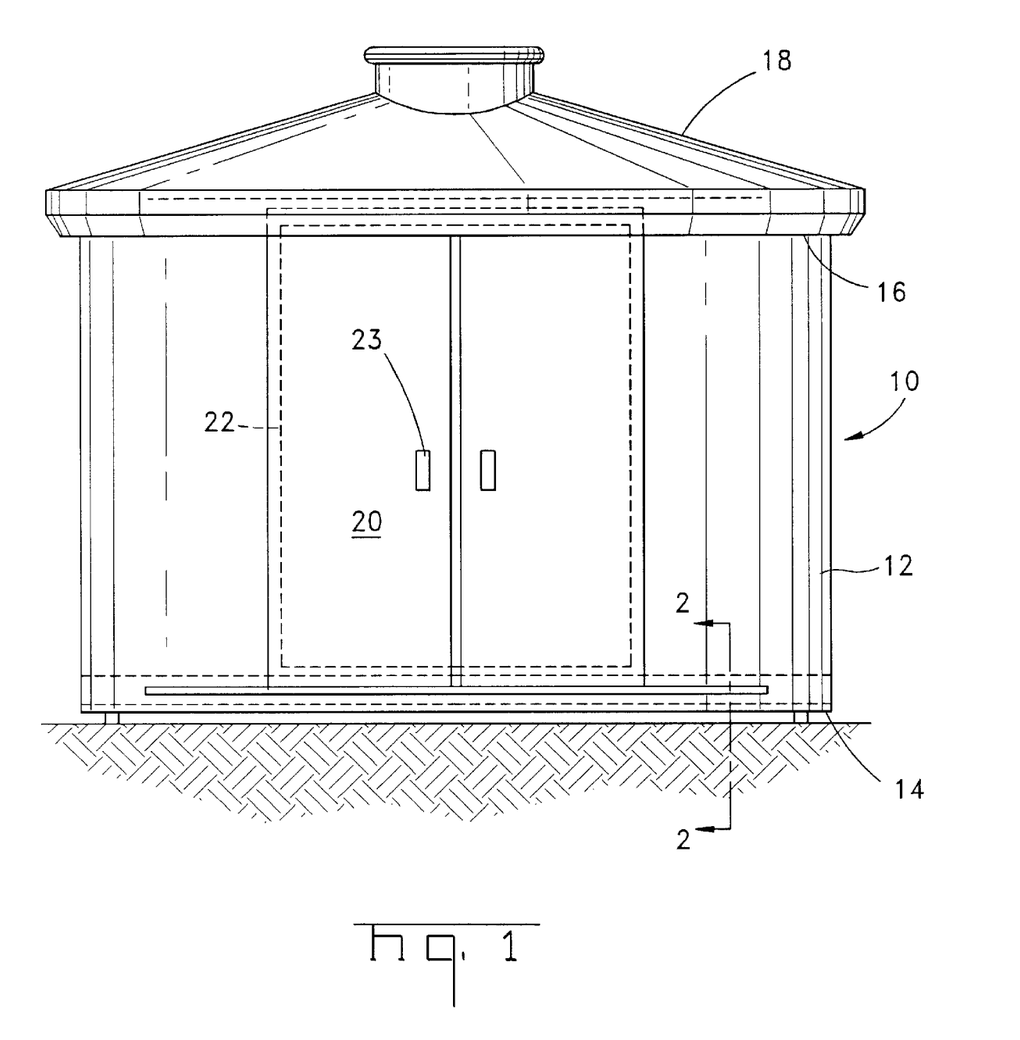
FIG. 1 is a side elevational view of the type of circular rotational building on which the improved roller assembly of this invention may be utilized.

FIG. 1 is an elevational view of the type of rotatable building to which this invention is directed. Such building 10 comprises an upstanding vertical wall 12 having a lower edge 14 and an upper edge 16 joined to a roof 18, preferably a conical roof. The wall 12 has an access opening 20 with doors 22 suitably mounted for closing the opening 20. The vertical wall 12 is typically mounted on some roller means, where the present invention discloses an improved system, as will be made clearer from the description of FIGS. 2 and 3 to follow. Finally means, such as the side edges of the opening 20, corrugations in vertical wall 12, or the door handles 23, are provided to manually enable the building to be rotated until the opening 20 aligns with the selected area of the interior of the building 10 to allow access to the needed tools or equipment in the selected area.

Figure 2:
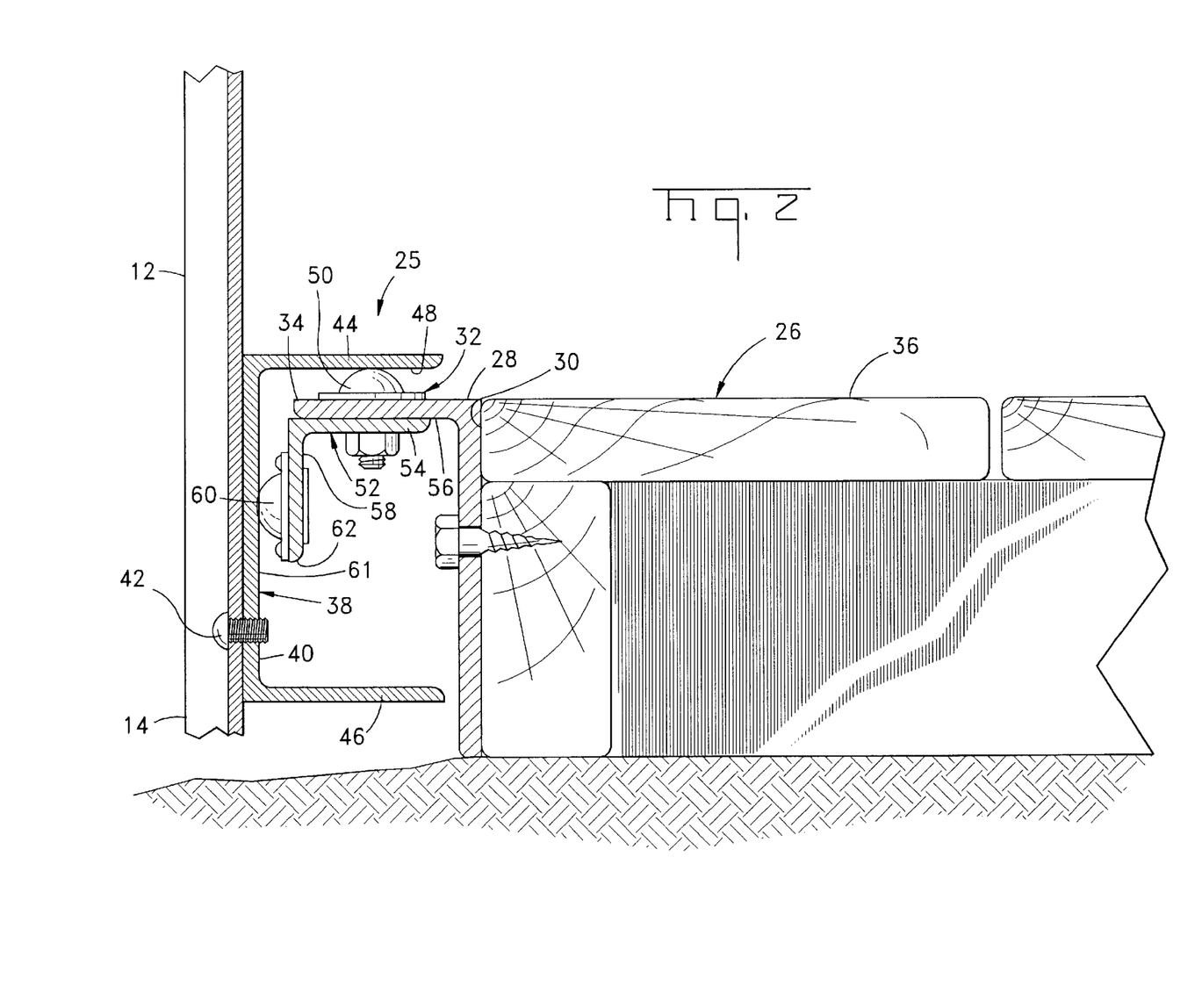
FIG. 2 is an enlarged, partial, sectional view illustrating the roller assembly of this invention, taken along line 2—2 of FIG. 1, where the respective components thereof are mounted between the lower edge of the movable vertical wall and the fixed foundation.
Figure 2A:
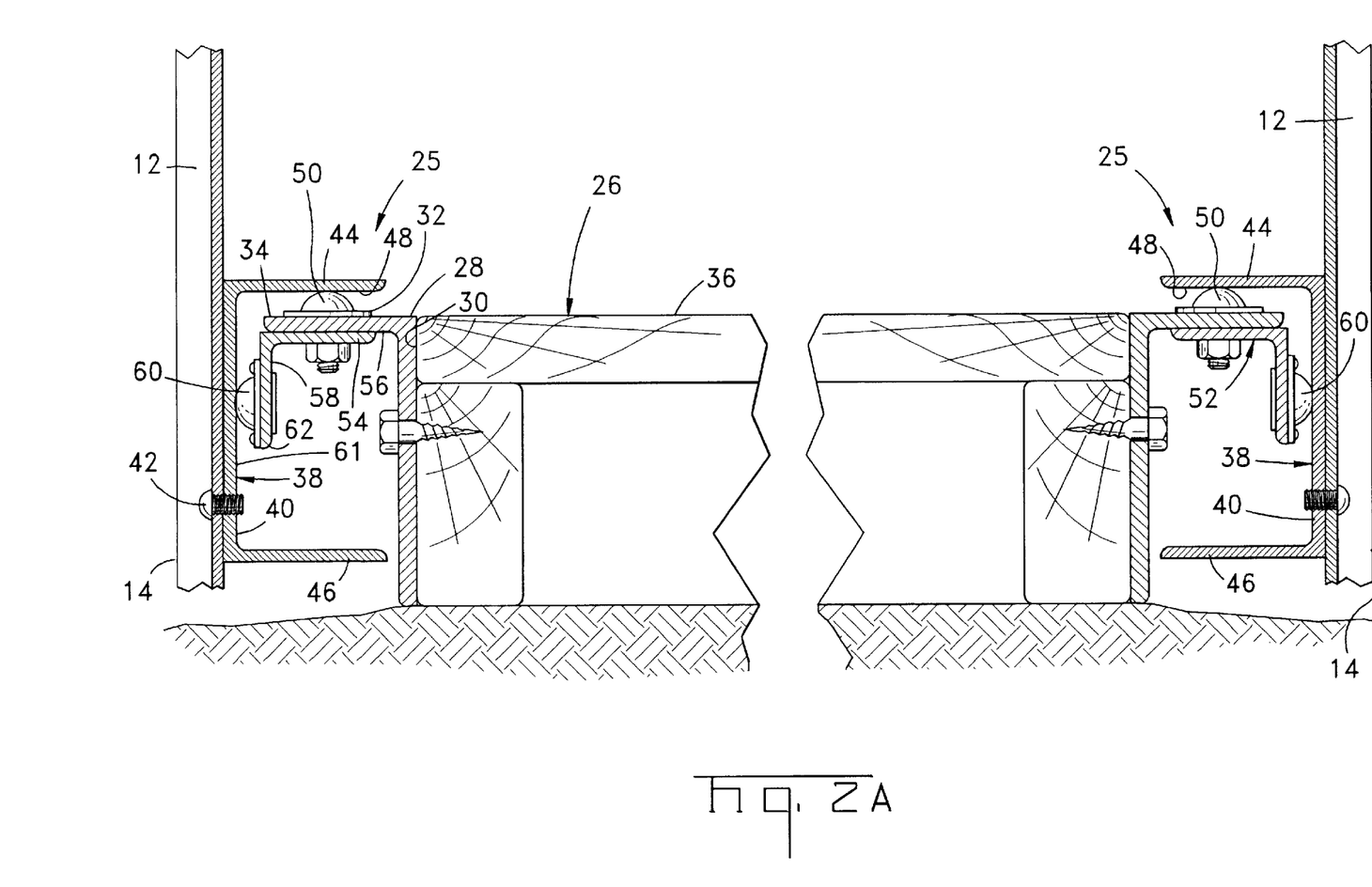
FIG. 2A is a sectional view, similar to FIG. 2, showing plural roller assemblies about the periphery of the circular rotational building in accordance with the present invention.

A first embodiment of the improved roller assembly 25 of this invention, as best seen in FIGS. 2 and 3, performs the dual purpose of (a) supporting the building 10 for rotation, while preventing binding during such rotation, and (b) preventing the walls from being moved laterally, or from tipping. Such dual purpose is achieved by the unique roller assembly 25, which includes cooperative means between the lower edge 14 and the fixed foundation 26, see FIG. 2. The cooperative means includes an L-shaped angle member 28 fixedly secured to the outwardly directed vertical or peripheral face 30 of the foundation 26. The L-shaped angle member 28 may comprise a single circular flange, or a series of flange segments uniformily positioned about the peripheral face 30. In either case, a like number of ball/transfer casters 32 are uniformly spaced thereabout, typically about eight (8) in number, along the laterally projecting leg 34 generally flush with the floor 36 of foundation 26. A ball/transfer caster, suitable for practicing this invention, though not limited thereto, is manufactured by the ACME Caster Company, Poughkeepsie, N.Y., and identified in their catelogues as Model Nos. NF 656A 3/4, SC 148A, and SC 148X8A. Typically, such ball/transfer casters consist of a housing, with a circular opening, partially receiving a nylon ball or sphere, and a plurality of ball bearings to facilitate multi-directional movement of the ball. Further, means are typically provided to fixedly secure the housing to an appropriate base.

Cooperating with the L-shaped angle member 28, and ball/transfer casters 32, is a U-shaped channel 38, mounted internally along the lower edge 14. The U-shaped channel 38, oriented with its base 40 secured to the lower edge 14 by a fastener 42, for example, is continuous, i.e. 360 degrees, with upper and lower legs 44, 46, respectively, projecting inwardly toward the peripheral face 30. As best seen in the sectional view of FIG. 2, the underside 48 of upper leg 44 is in rolling contact with the ball 50 of ball/transfer caster 32, and supported thereby for rotational movement. Binding is thus avoided as there are no curved or angle surfaces with which to contend.

To maintain a uniform spacing between the wall 12 and the U-shaped channel 38 secured thereto, and the peripheral face 30 of the foundation, a second L-shaped angle member 52 is provided. Specifically, a first leg 54 of member 52 is secured to the underside 56 of leg 34 (first L-shaped angle member 28), such as by the secured ball/transfer caster 32, while the second leg 58 projects downwardly and parallel to the base 40 of the U-shaped channel 38. The second leg 58 may be provided with a comparable ball/transfer caster 60 which is in rolling contact with the inner surface 61 of base 40. To minimize any premature lifting of tilting of the building 10, the second leg 48, or more precisely the end most portion 62 would bear against the lower leg 46.

Figure 4:
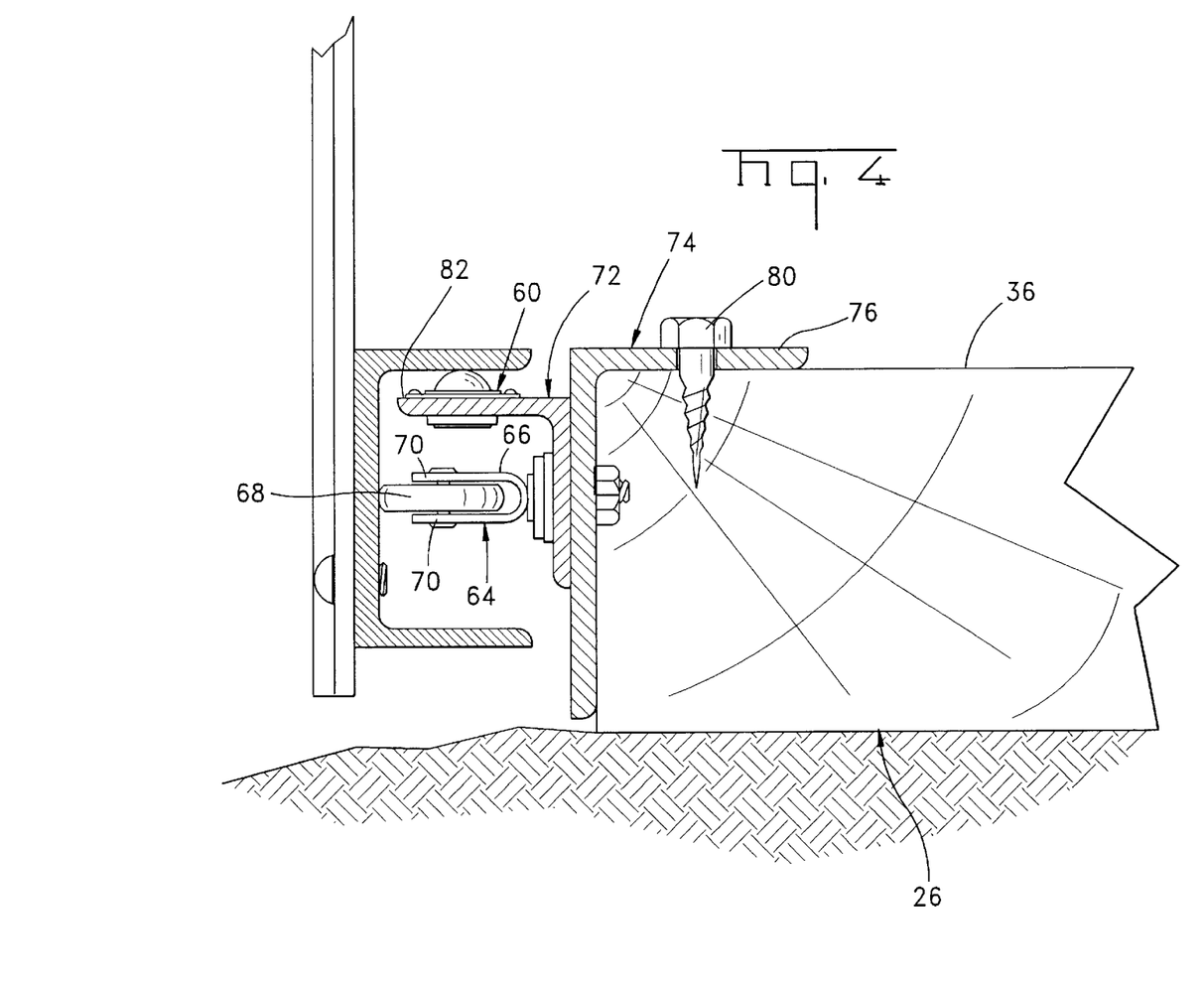
FIG. 4 is an enlarged, partial, sectional view, similar to FIG. 2, showing an alternate embodiment to an improved roller assembly according to this invention.

FIG. 4 represents an alternate embodiment to the roller assembly of FIGS. 2 and 3, where the lateral spacing control member is a conventional roller 64. Specifically, the roller 64 comprises a dual fork-like member 66 having a roller wheel 68 mounted for rolling engagement between the pair of legs 70. The roller 64, for this embodiment, is shown mounted to an L-shaped segment 72, which in turn is flush mounted to the L-shaped angle member 74. Note that the latter L-shaped angle member 74 is reverse mounted compared to its counterpart member 28 of FIG. 2. The horizontal leg 76 of L-shaped angle member 74 lies contiguous with the floor 36 of foundation 26, and fastened thereto such as by screw 80. However, with either embodiment (FIG. 2 and FIG. 4), a ball/transfer roller caster is used for rolling support of the building. With the latter embodiment, the ball/transfer caster 60 is mounted on the lateral leg 82 of L-shaped segment 72, for rolling contact with the upper leg 44 of U-shaped channel 38.

Figure 5:
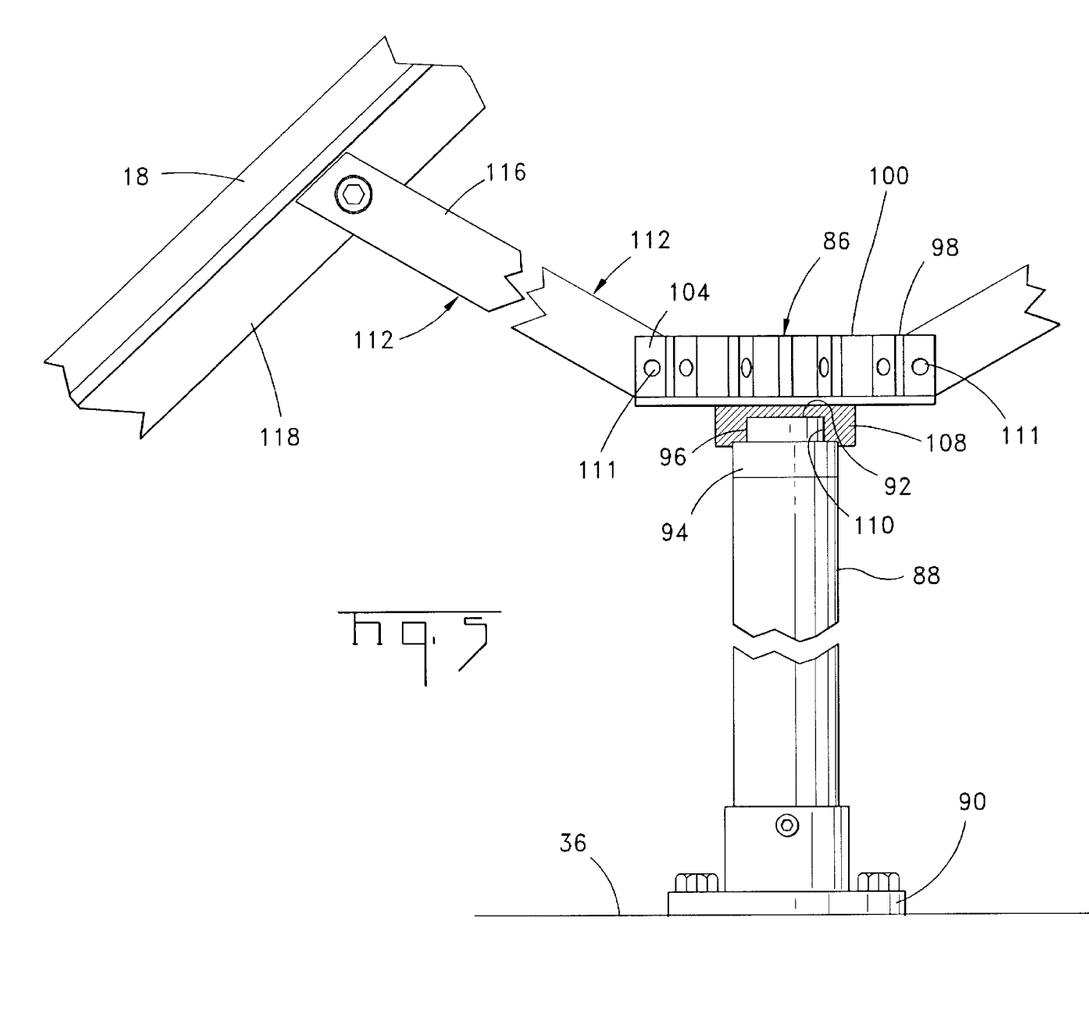
FIG. 5 is a partial side view, with parts exploded, of a central roof support system to facilitate movement of the rotational building supported thereby.
Figure 6:
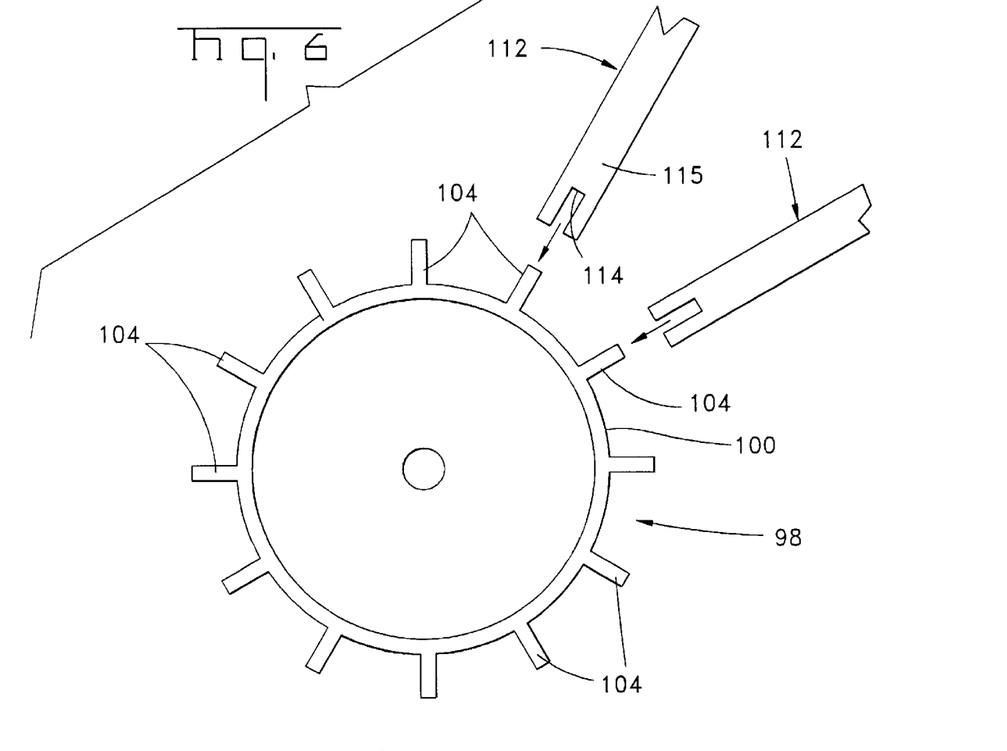
FIG. 6 is a top view of the rotating roof support, showing two radial supports in position for engagement with said roof support.
Figure 7:
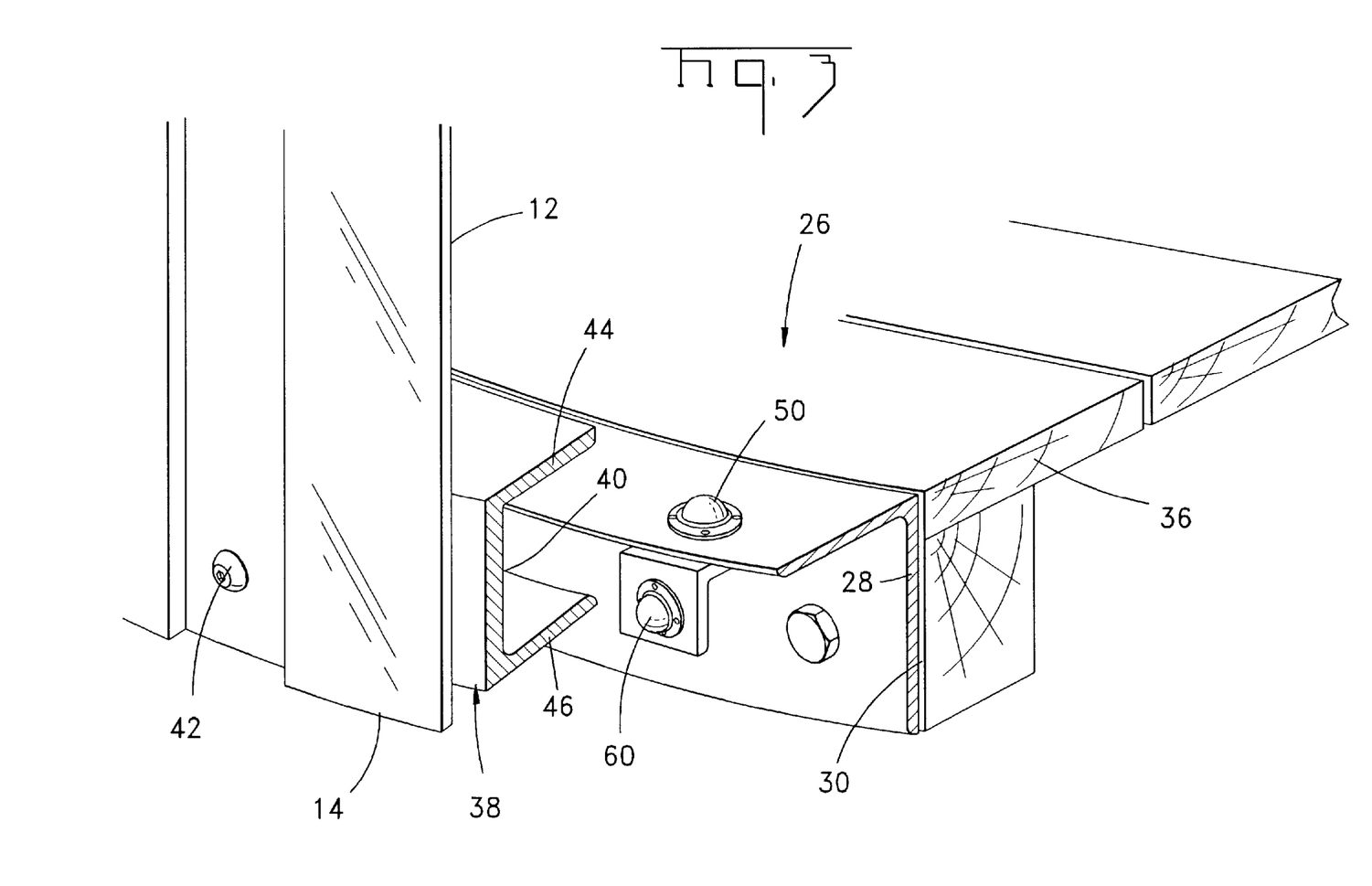
FIG. 7 is a side view of a component of the roof support system of FIG. 6.

It will be recalled that the momentum for rotating the building is by the user manually pulling or pushing on the side edges of the opening 20, corrugations in vertical wall 12, or the door handles 23 (see FIG. 1). With larger structures, some assistance or relief may be desirable. FIGS. 5 to 7 represent a roof support that might be used to help balance the weight of the roof by taking some of the weight of the roof off the ball/transfer casters 60. FIG. 5 is a side view, illustrating in part the rotating support mechanism 86. The rotating support mechanism 86 comprises a fixed center post 88 secured to the floor 36 by a flanged bracket 90. The opposite or upper end 92 of the post 88 includes a cap 94, such as fabricated from nylon, where the cap 94 includes a reduced concentric portion 96. Overriding the cap 94, for rotating movement thereon, is the roof support assembly 98. The support assembly 98 includes a circular flange member 100, see FIGS. 6 and 7, characterized by a continuous upstanding wall 102 and a plurality of radial arms 104. The flange member 100 is mounted on a circular plate 106, which in turn is mounted on a housing 108 having a central recess 110 configured to rotatably receive the reduced concentric portion 96.

To support the roof 18 of the building 10 the radial arms 104 have a through hole 111 to which a roof spar 112 is secured. The roof spar 112, in the form of a U-shaped channel, includes a cutout 114 on its base 115 to slide over the radial arm 104 to allow a fastener to be secured through the sides into hole 111. As illustrated in the left of FIG. 5, the opposite end 116 of each roof spar 112 is fastened to a complementary support beam 118, upon which the roof itself is secured, as known in the art. Thus, by the use of the unique roller assembly 25, particularly when supplemented by the rotating support mechanism 86, the desired dual purpose of (a) supporting the building 10 for rotation, while preventing binding during such rotation, and (b) preventing the walls from being moved laterally or from tipping, is achieved.

I claim:

1. In a rotatable building having an upstanding vertical wall terminating in a roof at an upper edge to enclose usuable space therewithin, means within said wall to allow access to selected locations within said building during rotation thereof, said vertical wall having a lower, free standing edge spaced from a fixed foundation having a planar surface, within said building, said fixed foundation being defined by an outwardly facing wall, whereby said outwardly facing wall and said lower, free standing edge define a relatively uniform annular space about said fixed foundation, the improvement comprising in combination therewith, an improved roller assembly comprising an angled member having a vertical base mounted to said free standing edge and a first horizontal leg, where said leg projects into said annular space, at least one L-shaped angle member having first and second legs, where said first leg lies essentially flush with said planar surface and said second leg thereof being fixed to said outwardly facing wall, where said first leg includes at least one ball/transfer caster assembly having a spherical roller therein, and said caster assembly is mounted to place said spherical roller in rolling contact with said first horizontal leg of said angled member.

2. The rotatable building according to claim 1, including a second ball/transfer caster assembly secured to said first leg of said L-shaped angle member and further including a spherical roller mounted for rolling contact with said vertical base of said angled member.

3. The rotatable building according to claim 2, wherein said L-shaped angle member is continuous, and includes a plurality of said ball/transfer caster assemblies spaced uniformly thereabout.

4. The rotatable building according to claim 2, wherein there are a plurality of L-shaped angle members uniformly spaced about the periphery of said fixed foundation.

5. The rotatable building according to claim 4, including a second L-shaped segment member fixedly mounted to said first leg of said first L-shaped member.

6. The rotatable building according to claim 5, wherein said angled member is a U-shaped channel having a second horizontal leg extending from said vertical base, where any tipping of said building is prevented by an interference contact between said second horizontal leg and said L-shaped segment member.

7. The rotatable building according to claim 5, wherein said second L-shaped segment member includes a downwardly projecting leg in near proximity to said vertical base, and said downwardly projecting leg mounts said second ball/transfer caster assembly which includes a spherical roller in rolling contact with said vertical base.

8. The rotatable building according to claim 1, including a central support post fixedly mounted to said foundation at a first end thereof, and at the opposite end a rotating flanged assembly mounting a plurality of roof spars connected to said roof, whereby to relieve some weight of said roof and said wall on said at least one ball/transfer caster assembly to facilitate manual rotation of said building.

9. The rotatable building according to claim 8, wherein said rotating flanged assembly includes a housing rotatively mounted to said opposite end, an upstanding circular member having a plurality of radial, outwardly projecting flanges, each said flange having means therein for securing a single said roof spar thereto.

10. In a rotatable building having an upstanding vertical wall terminating in a roof at an upper edge to enclose usable space therewithin, means within said wall to allow access to selected locations within said building during rotation thereof, said vertical wall having a lower, free standing edge spaced from a fixed foundation having a planar surface, within said building, said fixed foundation being defined by an outwardly facing wall, whereby said outwardly facing wall and said lower, free standing edge define a relatively uniform annular space about said fixed foundation, the improvement comprising in combination therewith, an improved roller assembly comprising an angled member having a vertical base mounted to said free standing edge and a first horizontal leg, where said leg projects into said annular space, a first L-shaped angled member having first and second legs, where said first leg thereof lies contiguous with and secured to said planar surface, and said second leg lies adjacent said outwardly facing wall, a second L-shaped angled member having first and second legs, having said first leg thereof extending outwardly and parallel to said first leg of said first L-shaped angled member, where said first leg of said second L-shaped angled member mounts a ball/transfer caster having a spherical roller in rolling contact with said first horizontal leg of said angled member.

11. The rotatable building according to claim 10, wherein said second leg of said second L-shaped angled member includes rolling means secured thereto in rolling contact with said vertical base.

12. The rotatable building according to claim 11, wherein said rolling means is a horizontally directed roller.

13. The rotatable building according to claim 11, including a central support post fixedly mounted to said foundation at a first end thereof, and at the opposite end a rotating flanged assembly mounting a plurality of roof spars connected to said roof, whereby to relieve some weight of said roof and said wall on said ball/transfer caster assembly to facilitate manual rotation of said building.

14. The rotatable building according to claim 13, wherein said rotating flanged assembly includes a housing rotatively mounted to said opposite end, an upstanding circular member having a plurality of radially, outwardly projecting flanges, with each said flange having means therein for securing a single roof spar thereto.

* * * * *